United States Patent

Stone et al.

[15] 3,681,755

[45] Aug. 1, 1972

[54] COMPUTER INDEPENDENT DATA CONCENTRATORS

[72] Inventors: John Alexander Stone, Brooklyn; Hal Bernard Lamster, New York; Charles L. Baker, New York; Spiro Bakiras, New York, all of N.Y.

[73] Assignee: Time Sharing Sciences, Inc.

[22] Filed: April 13, 1970

[21] Appl. No.: 27,678

[52] U.S. Cl. ............................................340/172.5

[51] Int. Cl. ..........................G06f 9/18, G06f 15/40

[58] Field of Search ....................340/172.5; 235/157

[56] References Cited

UNITED STATES PATENTS

| | | | |
|---|---|---|---|
| 3,525,079 | 8/1970 | Cuccio | 340/172.5 |
| 3,407,387 | 10/1968 | Looschen et al. | 340/152 |
| 3,413,612 | 11/1968 | Brooks et al. | 340/172.5 |
| 3,296,596 | 1/1967 | Yagusic et al. | 340/172.5 |
| 3,362,015 | 1/1968 | Mackie et al. | 340/172.5 |
| 3,378,820 | 4/1968 | Smith | 340/172.5 |
| 3,390,379 | 6/1968 | Carlson et al. | 340/172.5 |

*Primary Examiner*—Paul J. Henon
*Assistant Examiner*—Mark Edward Nusbaum
*Attorney*—Stanley J. Silverberg

[57] ABSTRACT

A multiplex data concentration system for interconnecting multiple users at a single station with a remotely located digital data processing system over a single data channel (such as a telephone line) without modification to the data processing system or the data processing system side of the line. A major feature of the system is a unique data concentrator which is located on the user station side of the data channel, and has a plurality of user data interchange devices (such as teletypewriter devices connected as inputs and an output connected to the data channel. The concentrator includes preassigned data storage areas corresponding to each data interchange device and utilizes identification characters to prefix data sent to the data processing system for proper routing and processing within the data processing system. An appropriate application (user's) program enables the data processing system to process the data appropriately and to prefix transmitted data with similar identification characters to enable the concentrator to route the processed data to the appropriate user.

2 Claims, 2 Drawing Figures

Fig. I

INVENTORS
John Alexander Stone
Hal Bernard Lamster
Charles L. Baker
Spiro Bakiras
BY [signature]
ATTORNEY INVENTORS
John Alexander Stone
Hal Bernard Lamster
Charles L. Baker
Spiro Bakiras BY [signature]
ATTORNEY.

COMPUTER INDEPENDENT DATA CONCENTRATORS

This invention relates to time-sharing computer systems and, in particular, to the conversion of a user station having a single data channel connection to a computer into a multiple user station using the same single line connection without modification to the computer or the computer side of the channel.

In many time-sharing applications it is desired that several terminal users have continuous access to a time-shared computer. Users of most time-sharing computers are charged according to the amount of time they maintain a channel (such as a telephone line) to the computer. Thus the maintenance of more than one terminal at a particular location or station in connection with the computer results in significantly higher costs.

To reduce these line connection costs to a minimum, it is desired to maintain a single terminal device connected through a single line to the computer but to enable several users to simultaneously use the terminal device and single line. Prior methods and approaches to this objective require either modifications to the computer itself or insertion of hardware at both the computer and user sides of the line. The present invention contemplates that the only modification need be made at the user side of the line.

It is therefore an object of the present invention to convert a single user terminal connected to a computer by a single line into a multiple user terminal connected by the same single line.

It is also an object of the present invention to convert such single user terminal into a multiple user terminal without modification to the computer side of the line.

It is an additional object of the present invention to significantly reduce on-line costs for a multiple user terminal.

It is a further object of the present invention to enable the conversion of a single user terminal to a multiple user terminal without requiring the approval or cooperation of the computer time-sharing vendor.

It is another object of the present invention to provide apparatus for concentrating many low speed channel inputs into a single high speed channel for exchanging data with a computer.

It is still another object of the present invention to provide apparatus for concentrating channel inputs of different speeds into a single channel for exchanging data with a computer at a preselected speed.

It is a still further object of the present invention to provide apparatus for concentrating channel inputs using different codes into a single channel for exchanging data with a computer.

It is another object of the present invention to provide such apparatus which appropriately encodes received data prior to transmission to the computer and decodes received data from the computer to enable proper exchange of data with appropriate users.

It is still an additional object of the present invention to provide apparatus for converting a batch or non-time sharing computer into a time sharing computer having multiple users interchanging data with said computer over a single channel.

In accordance with the invention, a multiplex data concentration system interconnects multiple users at a single terminal with a remotely located digital computer over a single data channel without modification to the computer or the computer side of the channel. The system includes a remotely located, unmodified digital computer having the capability of servicing a plurality of terminals. A user terminal, having a plurality of individual user data interchange devices, interchanges programmed information with the computer. A single data channel transmits data between the terminal and the computer with the data line interfacing directly with the computer. At the user terminal side of the data line a data concentrator, which has each of the user data interchange devices connected as inputs of the concentrator, has an output connected to the data line. The concentrator substantially simultaneously processes information transferred between each of the user devices and the computer over the single data line.

For other and further objects of the present invention reference may be made to the accompanying drawings and description while the scope of the invention will be pointed out in the appended claims.

Figure 1:
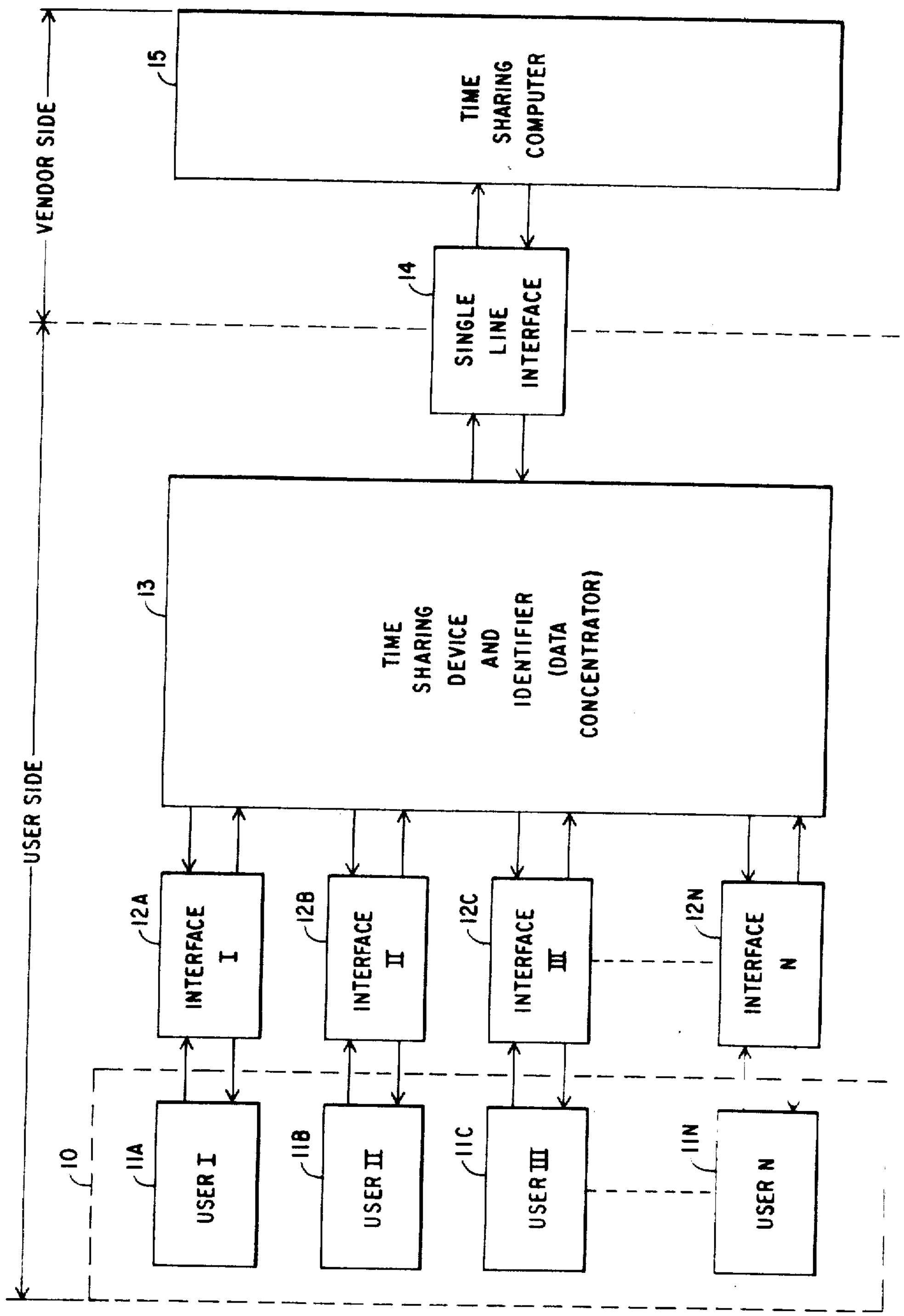
FIG. 1 illustrates a block diagram showing the application of the present invention in a multiple user terminal using a single telephone line to a time-sharing computer.

Referring first to FIG. 1, the basic system of the present invention is shown in block diagram form. At a single user station 10, a number of individual user data interchange devices 11 A, B, C, . . . N are available, each for interchanging programmed information with a central data processing system shown as computer 15. It should be understood that such computer may include appropriate "front end" apparatus, and any necessary peripheral equipment such as additional CPU's and the like. The user data interchange device may typically be a typewriter, teletypewriter keyboard, video display or other suitable input-output (I/O) device. Each data interchange device interfaces with the data concentrator 13 of the present invention which will be described in greater detail below. The interfaces 12A, B, C, . . . N may either be a permanent connection (i.e."hardwired") to the concentrator 13 or may be otherwise connected such as by telephone through the use of suitable data sets or acoustic couplers which are well known in the art. (See Telecommunication and the Computer, Prentice Hall, 1969, at Page 120; Anderson Jacobson, Inc., of Mountainview, Calif., for example, manufactures commercially available acoustic couplers of this type such as its Model ADC 260.)

The concentrator 13 (so named for its ability to concentrate a plurality of data input lines to a single output line) out interfaces with a remotely located computer 15 over a single line interface 14 which is typically a voice grade telephone line. The concentrator 13 is located on the user side of the single line interface 14 and is under complete control of the user. The concentrator substantially simultaneously processes information transferred between each of the user interchange devices 11 and the computer 15 over the single data line 14. (Computers 15 referred to herein may be of the well known types discussed in ch.2 of Time Sharing Data Processing Systems by James Ziegler, Prentiss Hall 1967.)

It should be noted that the system proposed in FIG. 1 requires no modification at all to the vendor side. The concentrator 13 is connected between the multiple user devices 11 and the user side of the single line interface 14. In addition, there are absolutely no modifications required in the computer hardware or to the computer operating and executive system program. The basic conversion of a multiple user terminal having a number of "on line" connections to a computer to a single line interface (with a corresponding reduction in line costs)can can be effected by simply inserting the concentrator of the present invention and following the required user applications program which will be subsequently described.

Figure 2:
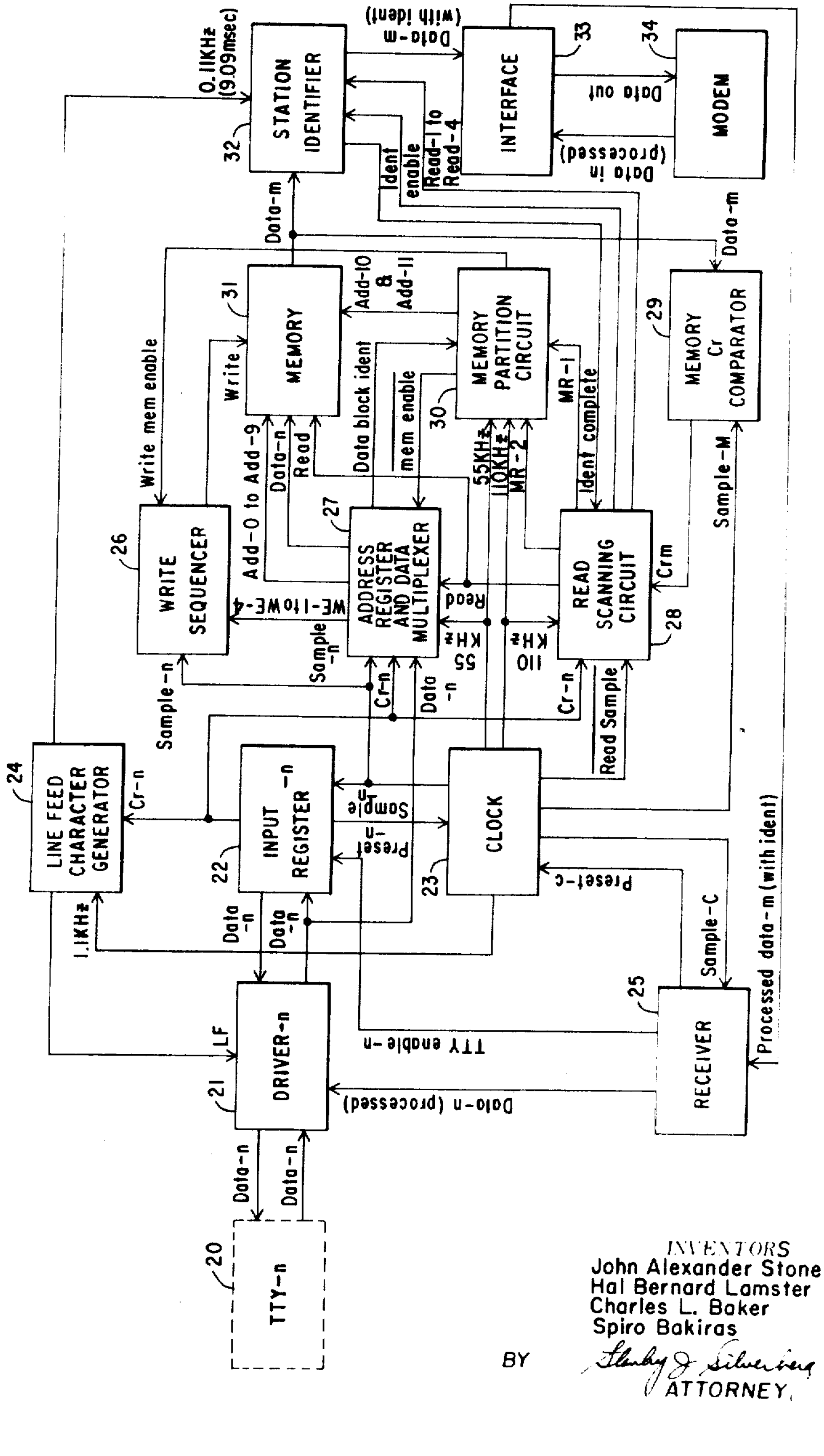
FIG. 2 is a block diagram of a principal embodiment of the time sharing apparatus of the present invention.

The operation of the concentrator 13 can be explained by referring the FIG. 2. FIG. 2 refers to a specific embodiment of the present invention employing a plurality of teletype terminals as inputs to the concentrator 13. The teletypewriter units 20 are designated as TTY-*n* devoting a set of *n* such units. Each of the teletypewriter units is inherently adapted to transmit data, line by line, through the concentrator 13 to the computer and also receive data in a similar fashion from the computer (with respect to teletypewriter units 20, see page 457 of the glossary in Telecommunication, and the Computer, Prentice Hall, 1969 ).

In broad aspect, the concentrator 13 includes means which are simultaneously responsive to data transmitted over each input data line for storing a predetermined quantity of data corresponding to each data line, in assigned storage areas. This means for storage is illustrated by the memory 31, memory partition circuit 30 and to some extent by address register and multiplexer unit 27. The write sequencer 26 also operates to effect the storage function. Also included are means for selectively removing stored data corresponding to a particular data line from assigned storage areas shown as read scanning circuit 28 and memory or comparator 25.

Means are additionally included for identifying the removed data corresponding to a particular data line with an appropriate coded character corresponding to the same data line and for transmitting the identified data to a computer over a single line which is station identifier 32.

Finally, means shown as receiver 25, are included for receiving processed identified data from the computer and for routing said data to the appropriate data interchange device.

For every teletypewriter unit 20, there corresponds a driver 21 which forms the input stage to the concentrator 13. That is, if there are n teletypewriter units there must also be n drivers. The driver 21 enables the teletypewriter data pulses to be converted to 5 volt standard logic pulses in order to be compatible with the concentrator logic stages. In addition, the driver 21 accepts 5 volt logic pulses from the concentrator when it is necessary to drive the teletype unit.

The *n* drivers 21 are coupled to *n* input registers 22, each of which containing a conventional serial to parallel converter and an eight bit digital comparator. (See DEC's Digital Logic Handbook, 1969, Ppg. 83–87 and 148–149.) The function of each input register 22 is to examine the eight data bits of each 11 bit character as it is received from the corresponding teletypewriter unit and determine whether it is a "carriage return" signifiying the end of a transmitted block of data from that unit. That is, all or part of one line of a teletypewriter transmission has been entered from that unit, when a "-carriage return" occurs.

At an appropriate time corresponding to when the nth teletypewriter unit begins to transmit a character (the first bit of each character being a logical "zero" which initiates the response), the corresponding input register produces a signal (preset-*n*) to the clock 23. (See Digital Logic Handbook, 1969, Ppg. 24–25, and 230 for commercially available clocks 23 of this type.)

The clock 23, of any appropriate design well-known to those skilled in the art, generates a series of sample pulses (sample-*n*) upon receipt of the present-*n* signal. Since the standard data processing code, ASCII, requires 11 bits per character, the preset-*n* signal causes 11 such sample pulses to be generated. These pulses enable the 11 bit character to be read into the input register and also to be echoed back to the teletypewriter unit through the driver-*n* 21.

The clock typically employs a crystal oscillator (such as 110. 011 khz a multiple of 1. 0011 kite, being a conventional teletypewriter data vote, or other appropriate frequency) and a series of decade counters to develop the required frequencies (11oKC, 55KC, etc.) used throughout the concentrator. Flip-flops and gating circuitry are used to control the flow of the sample pulses from the clock.

When the 11 bit character has been fully read into an input register 22, the present-*n* signal becomes a logical zero, causing the clock to temporarily stop sending sampling pulses. The comparator in the input register-*n* 22 tests the eight data bits of 11 bit character and if these bits correspond to the code for a carriage return, a carriage return signal or *cr–n*, is provided to certain functional blocks of the concentrator and to the teletypewriter unit.

Since the entire interchange of data with a teletypewriter unit operates on a line by line data block, the carriage return signal, *cr–n*, signifying the end of such data group is used appropriately throughout the concentrator to end a block of data. If a carriage return is sensed, an input register 22 disables the corresponding teletypewriter unit so that no more data from that particular unit can be transmitted to the concentrator. The echo back to the teletypewriter unit is also disabled. The carriage return signal (*cr–n*), indicating a carriage return has been sent by the nth terminal, triggers a line feed character generator 24 which sends a line feed character back to the *n*th driver which causes the nth teletypewriter unit to advance one line.

The carriage return signal (*cr–n*) also resets the appropriate portion of address register and multiplex unit 27 and signals the read scanning circuit 28 as will be explained further below. Commercially available read scanning circuits 28 are referenced, for example, at Page 405 of the Digital Logic Handbook, 1969.

The sample pulses described above also operate to enter the data from the nth teletypewriter unit into the multiplexer portion of unit 27. Each of the sample-*n* pulses advances the appropriate portion of the address register of unit 27 by one bit.

The address register portion of unit 27 actually consists of a plurality $n$ of such address registers, corresponding to the number of teletypewriter units. Each of these registers consists of a 10 bit binary counter set to count from 0 to $2^9$. (As is appropriate for storing 1 line of teletypewriter data in this specific system but is not intended as a limitation.) "N" sets of 10 counter output lines are fed into 10 $n$ input digital multiplexers which connect to the 10 lower memory address inputs of the random access memory 31. An additional multiplexer channels the data from the proper input register terminal into the memory data input which will be discussed further below.

After the data is entered into the input register 22, the address register 27 provides an appropriate binary number indicating S1 to Sn. This binary number is used by the memory partition circuit 30 to indicate which of the $n$ terminal units is supplying the data, and the memory data block (portion of the divided memory) where it is to be stored.

The memory partition circuit 30 consists of two separate circuits. One circuit divides the memory 31 into a number of equal data blocks. For example, in a 4 user input situation with a 4096 bit memory, (which example will be used throughout as illustrative and is not meant to limit the invention in any way) a binary number is received from the address register. The memory partition circuit then divides the 4096 bit memory 31 (which typically is a random access core memory) into one of four equal 1024 bit "partitions", or data blocks producing the appropriate binary number at the 11th and 12th memory address terminals of the memory 31. The presence of this binary number will establish the base address for the data block (in this example 0, 1024, 2048, or 3072).

The other portion of the memory partition circuit 30 provides a timing signal (memory enable) to the address register 27 indicating that the memory has been partitioned and is ready to accept data. The partition circuit 30 also sends a "write memory enable" signal which is sent to the write sequencer 26. The memory enable signal is generated by a synchronizing circuit which satisfies the following logical conditions memory enable = $\overline{110KHz}$ + 55KHz. "Read memory enable" and "write memory enable" signals are generated alternately within the memory partition circuit 30. These commands insure that the system will not try to "write" into and "read" from the memory at the same time.

The "write memory enable" signal received by the write sequencer 26 operates in conjunction with the sample-$n$ pulse to initiate a write command. This causes the bit from the nth terminal to be read into the nth data block of the memory. The data is read into the memory typically at a 55KHZ rate (which is normally 500 times faster that the teletype data rate). Thus the memory circuitry has ample time to place each bit into the appropriate memory address of the proper partition regardless of the order of entry or the originating teletype unit.

The write sequencer 26 functions to sequentially scan each of of the channels in order to determine when a data bit is present in one or more of the input register 22 circuits. When the presence of a data bit is determined, a write command (synchronous with the "-write memory enable" synch pulse) is generated. In practice, the presence of a data bit in one of the input registers is indicated by the presence of a sample pulse which sets a flip flop. A scanning signal (WE—1 to WE—4 in a 4 channel system) sequentially scans each flip flop for the presence of such data bit. When a data bit is present, a "write" command is generated which causes the data bit to be read into the appropriate memory data block.

A memory read scanning circuit 28 continuously scans each of the four input registers (in this example at a 110KHZ rate) until a $cr$–$n$ signal is sensed indicating that the nth memory data block is "full" and no more data is to be entered into that data block.

The read scanning circuit 28 is an $n$ channel scanner which scans at a high rate such as 110KHZ. When a memory data block is "full" (indicated by the presence of a logical 1 at one of the 4 $cr$–$n$ inputs), the scanner stops scanning while a "read-n" command is generated. This command provides information to the station identifier 32 so that it can generate a character corresponding to the proper channel. An "ident enable" pulse is then sent to the station identifier 32 which generates the identification character followed by an "ident complete" pulse. The purpose of the identification character will be described below. The "ident complete" signal allows the read scanning circuit 28 to generate read commands to the memory and address register at a 110KHZ clocked rate. When all of the data in the memory data block in question has been read, a logical "1" appears at the "crn" input, allowing the read scanning circuit to continue to scan for another "-full" data block.

Thus, the read scanning circuit 28 provides information as to which memory data block is to be read out and enables the station identifier 32 to prefix the data from the $n$th terminal with an appropriate identifying character corresponding to the originating terminal (e.g. by supplying a binary 0 to 3 into identifier 32 which in turn supplies an ASC II 1 to 4 as a prefix character). The contents of the memory data block then follow the identification character through the modem and the interface 33, 34, and to the data processing system at a 11KHZ data rate. (See Digital Logic Handbook Ppg. 188 & 202-203 for commercially available interfaces 33; and see Pg. 192 of Telecommunications and the Computer for reference to modems 34.)

Data leaving the memory 31 is also sampled by a memory $cr$ comparator 25. (See Ppg. 148-149 of Digital Logic Handbook. This functional block which is normally a conventional series to parallel converter and eight bit digital comparator, samples each 11 bit ASC II character leaving the memory for a carriage return, indicating that all the data in the particular data block has been read out. When such a carriage return from a memory partition is sensed, a carriage return signal ($cr$–$m$) is generated by the memory cr comparator 25. This signal inhibits the read scanning circuit from issuing further read commands to that data block and, as stated above, enables the read scanning circuit to continue to scan for other "full" memory data blocks. Thus, only one memory data block may be read out at any one time and the remaining data blocks must wait until all of the data in the data block being read has been transmitted, even though they may be "full."

Thus in summary, the data from any or all of $n$ teletypewriter units is read into the concentrator line by line. The data from each teletypewriter unit is entered into an input register and simultaneously into appropriate data block of an equally partitioned memory, each data block or partition of the memory corresponds to a particular teletype unit. When a memory data block is "full," as determined by appropriate read scanning circuitry, the data is read out of the particular data block prefixed by an identifying character and sent over the phone line to the data processing system.

The data is then processed by the data processing system which transmits the processed data back to the concentrator also prefixed by the same identification character. The data processing system accomplishes this character prefixing by appropriate user programming at the user's end. This will be explained in more detail below.

The processed data is then channeled directly to the receiver 25 which decodes the identifying character and channels the data to the appropriate teletypewriter unit. An enabling signal is then sent to the appropriate input register enabling it to once more accept data from its terminal and echo it back. Receiver 25 samples the first ASCII character transmitted by the computer in an 11 bit shift register (serial to parallel converter). In the present example four teletypewriter units, four comparators are connected to the shift register, each sampling for the identification character corresponding to a different terminal. After the identification character is read, the signal is routed to the corresponding terminal by way of a channel selector of four gates.

After the data is routed to the proper terminal, it is further sampled by and tested by another serial to parallel converter and comparator in the receiver for a carriage return (which would indicate the end of a "-block" of data sent by the computer).

The same procedure is repeated for each subsequent ASCII character.

An example of a user program for properly routing data in the data processing system and prefixing processed data with an appropriate identification character is shown by the following Table 1:

TABLE 1

```
1    READ 2, ITERM, X
2    FORMAT (II,F10.4)
     ITERM = ITERM - 9
     GO TO (10,20,30)ITERM
10   CALL A(X)
     GO TO 1
20   CALL B(X)
     GO TO 1
30   CALL C(X)
     GO TO 1
     END

          SUBROUTINE A(X)
     X=X**.5
     TYPE 10,X
10   FORMAT($10$,F10.4)
     RETURN
     END

          SUBROUTINE B(X)
     X=X**2
     TYPE 10,X
10   FORMAT ($11$, F10.4)
     RETURN
     END

          SUBROUTINE C(X)
     X=X**3
     TYPE 10,X
10   FORMAT ($12$,F10.4)
     RETURN
     END
```

When the concentrator transmits a block of data which had originated at a particular teletypewriter unit, it is prefixed by an identifying character associated with the particular unit. The program then must read in the identification character followed by the data. Having read in the identifying character, the program must call the subroutine corresponding to the terminal associated with the character. The rest of the block of data is then stored in the subroutine corresponding to the correct terminal. After sufficient data, which may consist of one or more blocks, has been entered into a given subroutine, the subroutine may process the data. The processed data is then transmitted as directed by the subroutine in "blocks" from the computer with the appropriate identification character preceding each "-block".

In the example of Table 1, a Fortran user program is shown capable of the described multiplexing. This program contains three subroutines, each designed to perform a different function, although this need not be the case, In the example, the operator of teletype unit 10 desires to take square roots, the operator of terminal 11 wishes to take squares, and the operator of terminal 12 to cube numbers.

Statement 1 of the main program reads in "ITERM" (identification term), the identification character associated with the block of data being transmitted. In the example, "ITERM" will be a "10," "11," or "12," corresponding to terminals 10, 11, and 12 respectively. Statement 1 also reads in X, the data from each unit. The next executable statement in the program reduces "ITERM" to a 1,2, or 3 so that a "computed go to" statement can call subroutine $a$(X) or $b$(X) or $c$(X) depending on the "ITERM" 10, 11, or 12. The subroutine then processes the data and prefixes the response with a 10, 11, or 12 depending on which subroutine was called. This is done by statement 10 in each subroutine. Control is then returned to the main program which again goes back to Statement 1 to read in the next block of data.

For example, if the number "3" is typed in at terminal 12, a "3" (the data) preceded by a 12 (the identification character) is read into the program. Since the program associates this identification character with subroutine $c$(X), the data is transferred to the subroutine where it is cubed. A "27" or $3^3$ is then transmitted preceded by a 12. The program is then ready to read in more data.

Thus as described above, a user can, with the data concentrator of the present invention and by knowing how to properly program the remote data processing system, multiplex several data transmission devices into a time sharing computer over a single phone line. This will tie up only one computer port and will not require any modifications to the hardware or software not under the user's control.

An important application of the data concentrator is that it may be used with a non-time sharing or "batch" computer or data processor. In such application, the employment of the concentrator effectively converts the "batch" computer into a time-sharing computer as viewed from the multiple user side of the over-all system. Thus, although the present invention generally incompasses the concentrator of multiple data interchange devices at a particular location or station, in the conversion of a "batch" computer to a time-sharing computer, the various data interchange devices may be at separate locations or stations as well.

While the previous description of the novel data concentration system generally referred to teletype units as I/O devices and to high speed data transmission to the computer system, this is no way meant as a limitation. The concentrator can interchange data with the computer system at any desired speed, regardless of the speed of the I/O devices thereto. For example, the concentrator can converse with the computer system at 10,15 and 30 characters per second or over a high speed data channel. In addition, the concentrator can converse with each I/O device at a different speed as when teletypewriter keyboards, card readers and paper tape readers are used simultaneously. Different codes may also be used at the same time by different I/O devices (such as the ASCII and EBCDIC codes).

It should be noted that the total of the speeds (in bits/sec) of several I/O devices can be made to actually exceed the I/O line speed (in bits/sec). This can be done over intermittent line periods but not on a continuous basis. In this approach, the memory is used as a temporary buffer (in a receive mode) as well as in the normal transmit mode in the above description.

While the invention has been particularly shown and described with reference to preferred embodiments thereof, it will be obvious to those skilled in the art that various modifications and changes may be made therein without departing from the true spirit and scope of the invention.

What is claimed is:

1. A multiplex data concentration system for interconnecting multiple users at teletypewriter-like terminals with a remotely located data processing system over a single teletypewriter channel without modification to the data processing system, to the operating program for the data processing system or to the teletypewriter channel, comprising:

a remotely located, unmodified data processing system having the capability of servicing at least one teletypewriter-like terminal;

a user terminal having a plurality of individual user teletypewriter-like devices, said terminal for the interchange of programmed information with said data processing system;

a single data channel for transmission of data between the terminal and the data processing system, said data channel directly interfacing with the data processing system; and a data concentrator, located at the user terminal side of the teletypewriter channel, having each of the user teletypewriter-like devices connected thereto as inputs thereof and having an output connected to the teletypewriter channel, the concentrator for substantially simultaneously processing information transferred between each of said user devices and said data processing system over said single data channel, said concentrator comprising:

means substantially simultaneously responsive to data transmitted over each input data line for storing a predetermined quantity of data corresponding to each line in assigned storage areas, said means including a memory, a memory partition circuit for partitioning the memory according to the number of teletypewriter-like devices, an address register, a multiplexer and a write sequencer;

means for selectively removing data corresponding to a particular data line from assigned storage areas in the partitioned memory including a read scanning circuit and a carriage return comparator;

a station identifier for identifying removed data corresponding to a particular data line with a coded character corresponding to the same data line and for transmitting the identified data to said data system; and a receiver for receiving processed, identified data from the computer and for routing the data to the appropriate teletypewriter-like device.

2. The multiplex data concentration system described in claim 1, wherein said single data channel is a telephone line.

* * * * *